United States Patent [19]

Sutton et al.

[11] Patent Number: 5,276,878
[45] Date of Patent: Jan. 4, 1994

[54] METHOD AND SYSTEM FOR TASK MEMORY MANAGEMENT IN A MULTI-TASKING DATA PROCESSING SYSTEM

[75] Inventors: Peter G. Sutton, Yorktown Heights, N.Y.; William R. Cohen, Danbury, Conn.; Robert A. Blackburn, North Salem, N.Y.

[73] Assignee: International Business Machines Corporation, Armonk, N.Y.

[21] Appl. No.: 958,153

[22] Filed: Oct. 7, 1992

[51] Int. Cl.$^5$ .................................................. G06F 9/46
[52] U.S. Cl. ............................. 395/650; 364/DIG. 1; 364/246.6; 364/281.7; 364/781.4; 364/228.1
[58] Field of Search ....... 395/650; 364/DIG. 1; 246.6; 281.7; 281.4, 228.1

[56] References Cited

U.S. PATENT DOCUMENTS

| | | | |
|---|---|---|---|
| 4,249,241 | 2/1981 | Aberle et al. | 364/200 |
| 4,399,504 | 8/1983 | Obermarck et al. | 364/200 |
| 4,545,016 | 10/1985 | Berger | 364/200 |
| 4,742,447 | 5/1988 | Duvall et al. | 364/200 |
| 4,742,450 | 5/1988 | Duvall et al. | 364/200 |
| 4,757,447 | 7/1988 | Woffinden | 364/200 |
| 4,761,737 | 8/1988 | Duvall et al. | 364/300 |
| 4,805,097 | 2/1989 | DeSanna | 364/200 |
| 4,937,736 | 6/1990 | Chang et al. | 364/200 |
| 5,012,408 | 4/1991 | Conroy | 364/200 |
| 5,095,420 | 3/1992 | Eilert et al. | 395/400 |
| 5,113,506 | 5/1992 | Moussouris et al. | 395/400 |
| 5,125,086 | 6/1992 | Perazzoli, Jr. | 395/425 |
| 5,155,844 | 10/1992 | Cheng et al. | 395/575 |
| 5,197,148 | 3/1993 | Blount et al. | 395/575 |

OTHER PUBLICATIONS

Andrew S. Tanenbaum, "Modern Operating Systems," 1992, 491-492.

*Primary Examiner*—Gareth D. Shaw
*Assistant Examiner*—A. Katbab
*Attorney, Agent, or Firm*—Andrew J. Dillon

[57] ABSTRACT

A method and system are disclosed for efficiently managing task memory in a multi-tasking data processing system having a processor for processing multiple tasks, task memory associated with each task, main system memory and multiple data records stored within direct access storage. A data record is copied from direct access storage into a buffer in main system memory in response to an access of that data record by a particular task. A buffer within that task's virtual memory is then mapped to the data record and a write protect bit is associated with the task memory buffer. Thereafter, any attempt to store data into the buffer will temporarily halt processing of the task until a copy of the data record is written to a second buffer. Task processing is then resumed, after modifying the task's page table to reference the second buffer, and the task is then permitted to store data within the second buffer. In this manner, a second buffer copy of the data record is only created in response to an attempted modification of the data record, thereby minimizing the processor and memory assets required to manage data records in a multi-tasking data processing system.

10 Claims, 4 Drawing Sheets

5,276,878

METHOD AND SYSTEM FOR TASK MEMORY MANAGEMENT IN A MULTI-TASKING DATA PROCESSING SYSTEM

BACKGROUND OF THE INVENTION

1. Technical Field

The present invention relates in general to improvements in data processing systems and in particular to improved methods and systems for management of data records in task memory within a data processing system. Still more particularly, the present invention relates to improved methods and systems for management of data records in task memory in a multi-tasking data processing system.

2. Description of the Related Art

The management of large amounts of data within a modern state-of-the-art data processing system is an increasingly complex matter. Data records within such systems may be stored in many different media and utilizing various storage techniques. A common storage technology utilized for storing large numbers of data records is a so-called "Direct Access Storage Device" (DASD). Such devices are typically employed within storage subsystems and data therein may be accessed directly, without reference to data which was previously accessed.

Data records within such devices may be accessed relatively rapidly and efficiently; however, these records must be copied into system memory in order to be accessible to various tasks and/or applications within a data processing system, for reading and processing during program execution. In multi-tasking computers many tasks and/or applications may access each data record and simultaneous attempts to modify a record may occur. As a result, such systems generally do not permit individual tasks and/or applications to modify a data record directly. Instead, a copy of a selected data record is placed within a separate buffer which then serves a "private" copy of that data record for a particular task.

In virtual memory systems each task generally includes a storage space, or task memory, that may be regarded as addressable main storage wherein virtual addresses are mapped into real addresses within the system memory. Thus, in prior art systems a data record retrieved from a Direct Access Storage Device and copied into main storage will then be copied into a separate buffer and then mapped into a virtual address space associated with the task which initiated the data record retrieval.

It should be apparent upon a review of the system description above that the possibility that more than one task may attempt to store data into a single data record requires the creation of multiple copies of that record, resulting in a substantial utilization of processor and system assets. Thus, if the creation of individual copies of data records for each task could be avoided, system efficiency would increase.

In situations in which a data record will only be read by one or more tasks the copying of that record into individual buffers is not required; however, it is difficult to determine in advance whether or not a task or application will need to write data into a record. Early releases of the Transaction Processing Facility system by International Business Machines Corporation gave users the option of electing a "read only" access of a data record; however, an attempt to write to a record after electing a "read only" access would result in an unrecoverable error.

It should therefore be apparent that a need exists for a method and system which permits transparent "read only" or "read-write" access to data records and which generates a separate copy of a data record only if an attempted storage of data occurs.

SUMMARY OF THE INVENTION

It is therefore one object of the present invention to provide an improved data processing system.

It is another object of the present invention to provide an improved method and system for management of data records in task memory within a data processing system.

It is yet another object of the present invention to provide an improved method and system for management of data records in task memory in a multi-tasking data processing system.

The foregoing objects are achieved as is now described. The method and system of the present invention may be utilized to efficiently manage task memory in a multi-tasking data processing system having a processor for processing multiple tasks, task memory associated with each task, main system memory and multiple data records stored within direct access storage. A data record is copied from direct access storage into a buffer in main system memory in response to an access of that data record by a particular task. A buffer within that task's virtual memory is then mapped to the data record and a write project bit is associated with the task memory buffer. Thereafter, any attempt to store data into the buffer will temporarily halt processing of the task until a copy of the data record is written to a second buffer. Task processing is then resumed, after modifying the task's page table to reference the second buffer, and the task is then permitted to store data within the second buffer. In this manner, a second buffer copy of the data record is only created in response to an attempted modification of the data record, thereby minimizing the processor and memory assets required to manage data records in a multi-tasking data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
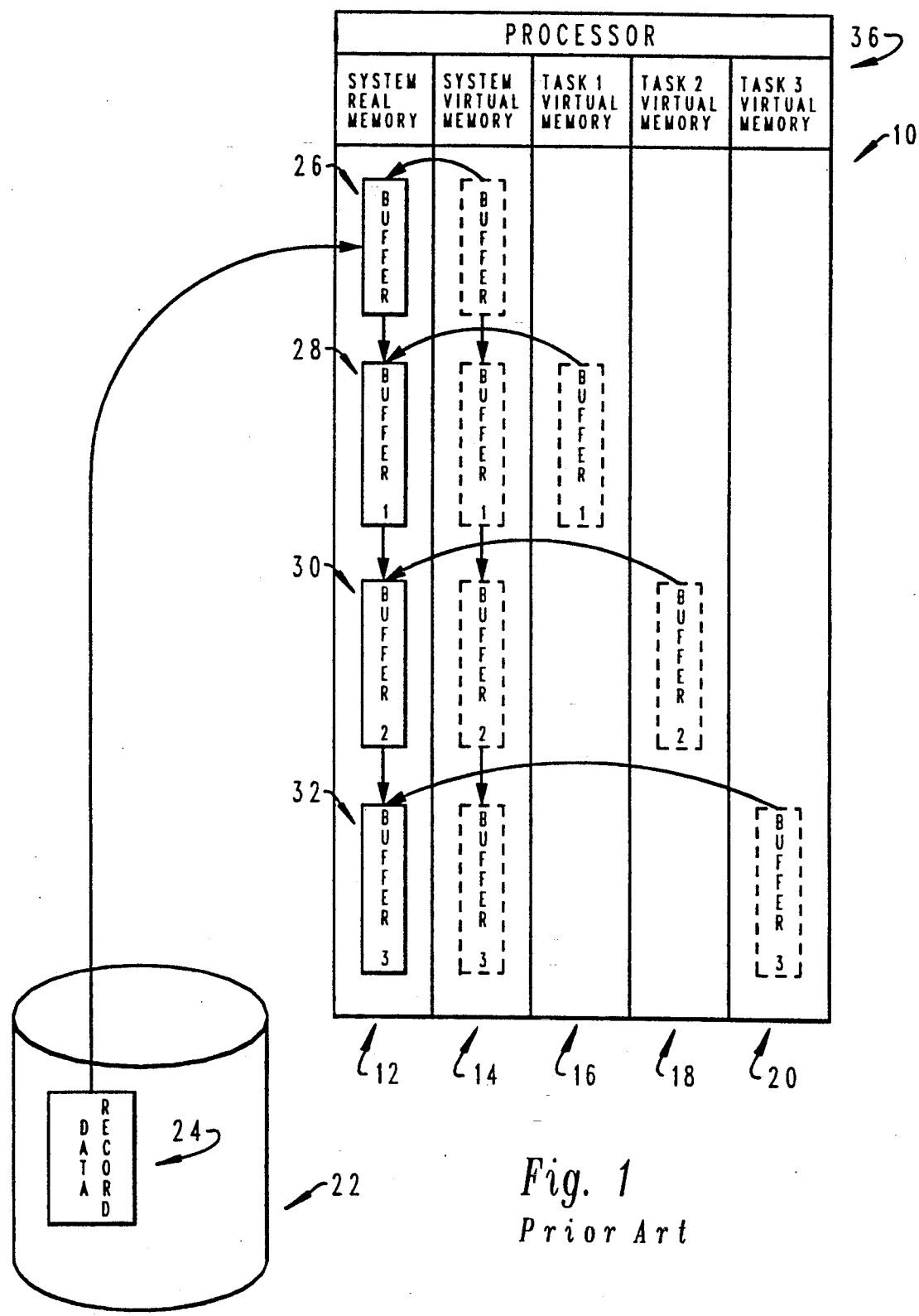
FIG. 1 is a high level block diagram of a prior art data record management system in a multi-tasking data processing system.

With reference now to the figures and in particular with reference to FIG. 1, there is depicted a high level block diagram of a prior art data record management system in a multi-tasking data processing system. As illustrated, data processing system 10 includes a processor 36 and multiple memory spaces 12, 14, 16, 18, and 20. As graphically illustrated, system real memory 12 is accessible by processor 26 and may be utilized to store copies of data records, such as data record 24 within Direct Access Storage Device 22. As is typical in such systems, data record 24 may be copied into a buffer 26 within system real memory 12. Thereafter, multiple copies of data record 24 are generated within additional buffers within system real memory 12, such as buffer 28, buffer 30, and buffer 32. An associated buffer within system virtual memory 14 is then created for each buffer 26, 28, 30, and 32. Additionally, each task virtual memory space 16, 18, and 20 includes a buffer which is mapped to an associated "private" copy of the data record within a buffer space within system real memory 12.

Thus, for example, task 2 virtual memory includes a virtual memory buffer which maps to buffer 30 within system real memory. In this manner, any changes to data record 24 which are written to the record by task 2 will be copied into buffer 30 within system real memory 12 until such time as that record will be updated within Direct Access Storage Device 22, following a "commit" or other event which permits the updating of data record 24.

Upon a review of FIG. 1, it should thus be apparent that for a multi-tasking data processing system, such as data processing system 10, a copy of data record 24 must be established within a separate buffer for each task within data processing system 10 which may access data record 24 and write data thereto.

Figure 2:
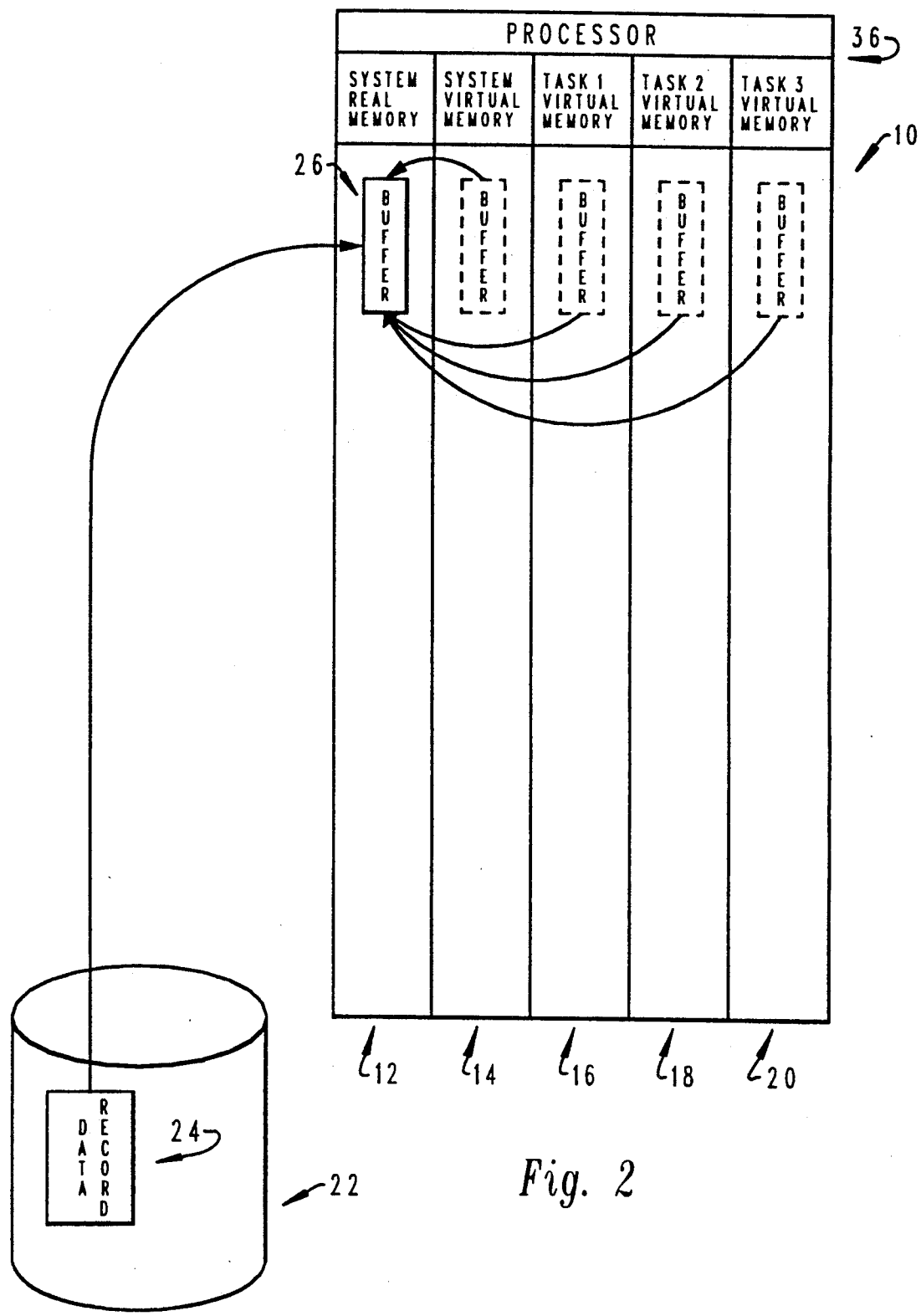
FIG. 2 is a high level block diagram of a data record management system in a multi-tasking data processing system in accordance with the method and system of the present invention.

Referring now to FIG. 2, there is depicted a high level block diagram of a data record management system in a multi-tasking data processing system in accordance with the method and system of the present invention. As described above with respect to FIG. 1, data processing system 10 includes a processor 36 which may access multiple memory spaces within data processing system 10. In contrast to the system of FIG. 1, an attempt by a task within data processing system 10 to access data record 24 will initially result in the copying of data record 24 into buffer 26 within system real memory 12. A buffer is then established within system virtual memory 14 and each task virtual memory 16, 18, and 20. A mapping from each task virtual memory utilizing any known technique may then be utilized to permit each task to read data within buffer 26 in system real memory 12.

One example of a system which permits the mapping of a buffer address within task virtual memory to a buffer within system real memory is the so-called "Dynamic Address Translation" technique utilized by data processing systems provided by International Business Machines Corporation, such as the System 390 Architecture. In this manner, only a single copy of data record 24 is transferred into system real memory 12 and read accesses to that copy contained within buffer 26 in system real memory 12 may be accomplished by a plurality of tasks within data processing system 10.

Figure 3:
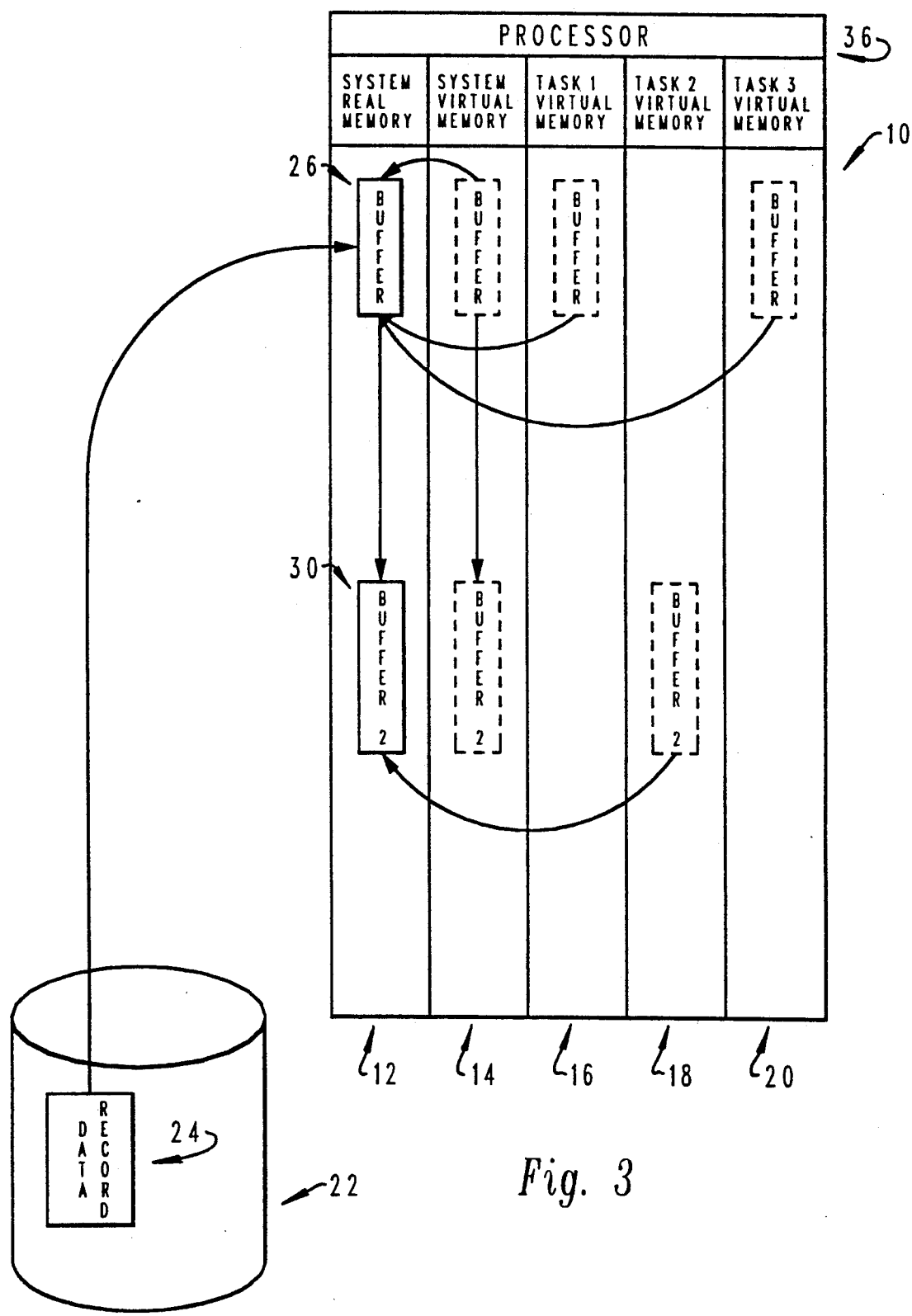
FIG. 3 is a high level block diagram of the data record management system of FIG. 2, following an attempted write to a data record.

Next, with reference to FIG. 3, there is depicted a high level block diagram of the data record management system of FIG. 2, following an attempted write to a data record by a task within data processing system 10. As illustrated, in the embodiment of data processing system 10 depicted within FIG. 3, task 2 has attempted to write data to a data record 24, as copied into buffer 26 within system real memory 12. In a manner which will be explained in greater detail herein, the attempted writing of data into buffer 26 by task 2 will cause a temporary suspension of the process represented by task 2 and the creation of a second buffer 30, within system real memory 12. Second buffer 30 includes a copy of data record 24 and the mapping from task 2 virtual memory space 18 into system real memory 12 is then altered to reflect a mapping to buffer 30.

At this point, the process represented by task 2 is resumed and task 2 is permitted to write data to a copy of data record 24 which is contained within buffer 30. In this manner, the number of copies of a data record which must be maintained for access by a plurality of tasks within a multi-tasking data processing system is minimized in that separate copies for each task are only created in response to an attempted write to the data record within system real memory.

Figure 4:
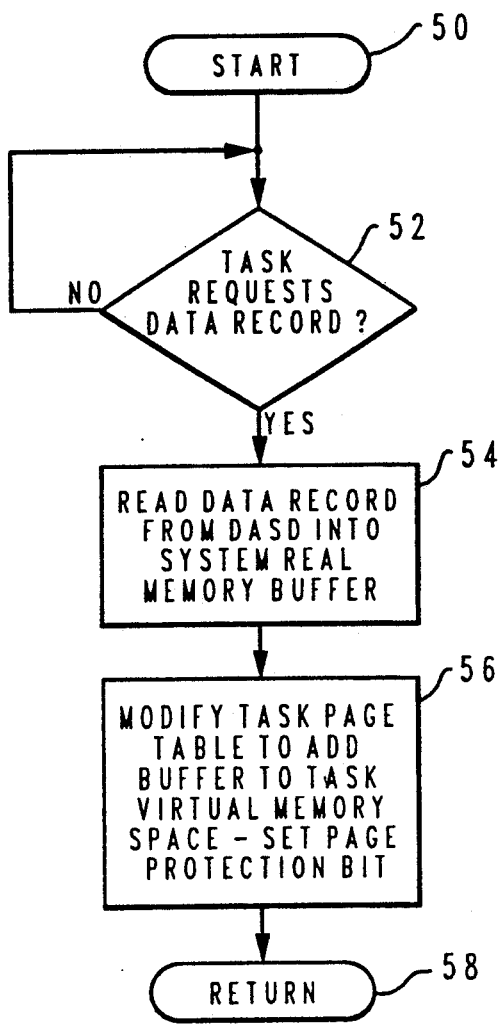
FIG. 4 is a high level logic flowchart illustrating the establishment of a data record management system in accordance with the method and system of the present invention.

Referring now to FIG. 4, there is illustrated a high level logic flowchart which depicts the establishment of a data record management system in accordance with the method and system of the present invention. As depicted, the process begins at block 50 and thereafter passes to block 52. Block 52 illustrates determination of whether or not a task within data processing system 10 (see FIG. 2) has requested a data record. If not, the system merely iterates until such time as a request for a data record is received. However, upon receiving a request from a task for a data record, block 54 illustrates the reading of that data record from Direct Access Storage Device 22 into buffer 26 within system real memory 12 (see FIG. 2).

After copying the data record of interest into a buffer within system real memory, the process passes to block 56. Block 56 illustrates the modifying of the task page table for the task which has selected the data record to add the buffer within system real memory to the task virtual memory space. Thereafter, a page protection bit is set. A page protection bit, as those skilled in the art will appreciate, is a bit which indicates that a page of memory, in a page memory system, is "write protected" and the system will thus prohibit any task or application from writing data to that page. Next, the process returns, as depicted at block 58.

Figure 5:
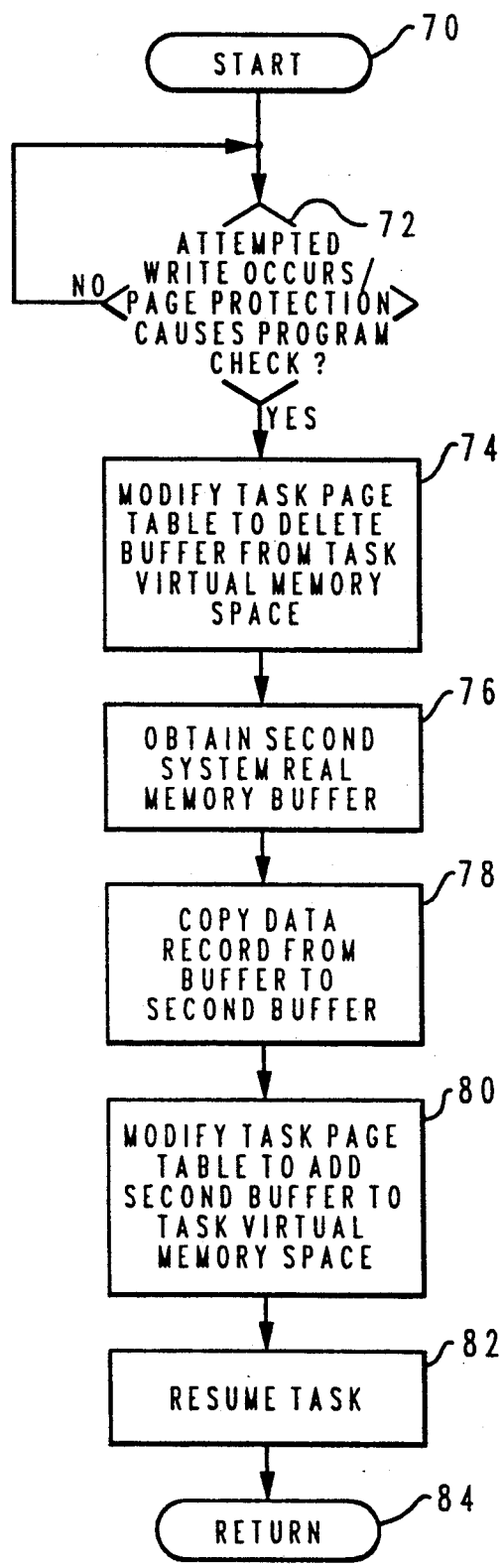
FIG. 5 is a high level logic flowchart illustrating the writing to a data record in a data record management system which has been established in accordance with the method and system of the present invention.

Finally, with reference to FIG. 5, there is depicted a high level logic flowchart which illustrates the writing to a data record established in accordance with the data record management of the present invention. As above, the process begins at block 70 and thereafter passes to block 72. Block 72 illustrates a determination of whether or not an attempted write to a page protected buffer within system real memory 12 has occurred. If not, the process merely iterates until such time as an attempted write occurs.

After a task within data processing system 10 has attempted to write data to a buffer within system real memory, the page protection bit therein will cause a program check, temporarily halting the process associated with that task. The location of the buffer which must be copied to permit a writing of data thereto may be accomplished utilizing any of several techniques. For example, the address of that buffer may be provided by data processing system 10 when reporting the page protection exception. Alternately, the instruction which was issued at the time of the protection exception may be decoded and the address referenced within that instruction determined. Finally, the determination of which particular buffer needs to be copied for a write update may be ignored and the system may simply keep track of those buffers within the system which have the potential for causing a protection exception. Thus, whenever an exception occurs, the buffers in question may be copied and the instruction retried to determine whether or not a protection exception is once again reported.

After determining which buffer must be copied from the protection exception report, or by utilizing one of the techniques described above, the process passes to block 74. Block 74 illustrates the modification of the task page table, for the task in question, to delete the mapping from the task virtual memory to the affected buffer(s) within system real memory. Thereafter, the process passes to block 76 which illustrates the obtaining of a second system real memory buffer. Data from the data record is then copied to the second buffer, as depicted at block 78.

After copying the data record to the second buffer within system real memory, the process passes to block 80. Block 80 illustrates the modification of the task page table associated with that task to add the second buffer to the task virtual memory space. Thereafter, as illustrated at block 82, the task is resumed.

At this point, as those skilled in the art will appreciate, the process within that task will write the desired update to the copy of the data record which is contained within the second buffer. In this manner, copies of data records into so-called "private" buffers is only initiated in response to an attempted write to a record. Processor and memory assets are efficiently utilized by only copying those records into additional buffers after an attempted write has occurred.

While the invention has been particularly shown and described with reference to a preferred embodiment, it will be understood by those skilled in the art that various changes in form and detail may be made therein without departing from the spirit and scope of the invention.

We claim:

1. A method for efficiently managing memory in a data processing system having a processor for processing a plurality of tasks, task memory associated with each of said plurality of tasks, main system memory and a plurality of data records stored within direct access storage, said method comprising the steps of:
    copying a selected data record from said direct access storage into main system memory at a first address in response to an access of said selected data record by a particular one of said plurality of tasks;
    detecting an attempt to write to said selected data record within said main system memory at said first address by said particular one of said plurality of tasks;
    temporarily halting said particular one of said plurality of tasks in response to a detecting of an attempt to write to said selected data record within said main system memory at said first address;
    copying said selected data record into said main system memory at a second address; and
    thereafter permitting said particular one of said plurality of tasks to write to said selected data record within said main system memory at said second address wherein copies of said selected data record are only created in response to an attempted writing to said selected data record.

2. The method for efficiently managing memory in a data processing system according to claim 1, wherein said task memory includes a task page table for storing task memory addresses which map into said main system memory and wherein said method further includes the step of entering said first address within said main system memory into said task page table in response to copying said selected data record from said direct access storage into said main system memory at said first address.

3. The method for efficiently managing memory in a data processing system according to claim 2, further including the step of deleting said first address from said task page table in response to detecting an attempt to write to said selected data record within said main system memory at said first address by said particular one of said plurality of tasks.

4. The method for efficiently managing memory in a data processing system according to claim 3, further including the step of entering said second address within said task page table in response to copying said selected data record into said main system memory at said second address.

5. The method for efficiently managing memory in a data processing system according to claim 2, wherein said step of entering said first address within said main system memory into said task page table further includes the step of marking said main first address within said system memory as protected from writing.

6. A data processing system for efficiently managing memory in a system having a processor for processing a plurality of tasks, task memory associated with each of said plurality of tasks, main system memory and a plurality of data records stored within direct access storage, said data processing system comprising:
    means for copying a selected data record from said direct access storage into main system memory at a first address in response to an access of said selected data record by a particular one of said plurality of tasks;
    means for detecting an attempt to write to said selected data record within said main system memory at said first address by said particular one of said plurality of tasks;
    means for temporarily halting said particular one of said plurality of tasks in response to a detecting of an attempt to write to said selected data record within said main system memory at said first address;
    means for copying said selected data record into said main system memory at a second address; and
    means for thereafter permitting said particular one of said plurality of tasks to write to said selected data record within said main system memory at said second address wherein copies of said selected data record are only created in response to an attempted writing to said selected data record.

7. The data processing system for efficiently managing memory in a system according to claim 6, wherein said task memory includes a task page table for storing task memory addresses which map into said main system memory and wherein said data processing system further includes means for entering said first address within said main system memory into said task page table in response to copying said selected data record from said direct access storage into said main system memory at said first address.

8. The data processing system for efficiently managing memory in a system according to claim 7, further including means for deleting said first address from said task page table in response to detecting an attempt to write to said selected data record within said main system memory at said first address by said particular one of said plurality of tasks.

9. The data processing system for efficiently managing task memory in a system according to claim 8, further including means for entering said second address within said task page table in response to copying said selected data record into said main system memory at said second address.

10. The data processing system for efficiently managing task memory in a system according to claim 7, wherein said means for entering said first address within said main system memory into said task page table further includes means for marking said first address within said main system memory as protected from writing.

* * * * *